United States Patent
Hauer

(10) Patent No.: US 6,695,344 B2
(45) Date of Patent: Feb. 24, 2004

(54) AIRBAG MODULE

(75) Inventor: Constantin Hauer, Schöllkrippen (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 10/208,933

(22) Filed: Jul. 31, 2002

(65) Prior Publication Data
US 2003/0042717 A1 Mar. 6, 2003

(30) Foreign Application Priority Data
Sep. 3, 2001 (DE) ................................ 201 14 507 U

(51) Int. Cl.[7] ............................................. B60R 21/16
(52) U.S. Cl. ................................... 280/731; 280/728.3
(58) Field of Search ........................... 280/731, 728.3, 280/729, 741

(56) References Cited

U.S. PATENT DOCUMENTS

| | | | | |
|---|---|---|---|---|
| 3,618,979 A | * | 11/1971 | Gulette .................. | 280/150 AB |
| 4,828,286 A | * | 5/1989 | Fohl ....................... | 280/731 |
| 5,125,682 A | * | 6/1992 | Hensler et al. ........... | 280/730 |
| 5,480,184 A | * | 1/1996 | Young ..................... | 280/731 |
| 6,042,147 A | * | 3/2000 | Nishijima et al. ....... | 280/743.1 |
| 6,224,100 B1 | | 5/2001 | Kamano et al. | |
| 6,505,851 B2 | * | 1/2003 | Frisch ..................... | 280/728.3 |
| 6,517,100 B2 | * | 2/2003 | Frisch ..................... | 280/728.2 |
| 6,536,801 B2 | * | 3/2003 | Frisch ..................... | 280/743.1 |

FOREIGN PATENT DOCUMENTS

| | | |
|---|---|---|
| DE | 19749914 A1 | 5/1999 |
| DE | 29921745 U1 | 5/2000 |

* cited by examiner

Primary Examiner—Christopher P. Ellis
Assistant Examiner—Rashmi Sharma
(74) Attorney, Agent, or Firm—Tarolli, Sundheim, Covell & Tummino L.L.P.

(57) ABSTRACT

An airbag module comprises an airbag and a front cover which is made of plastic. The front cover has a middle part and, surrounding the middle part, a predefined outlet opening for the airbag. In the closed state of said cover, the opening is surrounded by a ring-shaped part of the cover. The ring-shaped part is removed to free the outlet opening when the airbag is unfolded. The middle part is attached to the module in such a way that, when the airbag unfolds, the middle part is prevented from moving freely. The module further comprises a reinforcement ring which is embedded in the middle part and runs adjacent and along an inner edge of the ring-shaped part of the cover and attaches the middle part to the module, preventing it from moving freely when the airbag unfolds.

8 Claims, 3 Drawing Sheets

AIRBAG MODULE

TECHNICAL FIELD

The invention relates to an airbag module.

BACKGROUND OF THE INVENTION

Known airbag modules comprise an airbag and a front cover which is made of plastic and has a middle part and, surrounding the middle part, a predefined outlet opening for the airbag, the opening in the closed state being surrounded by a ring-shaped part of the cover, the ring-shaped part being removed to free the outlet opening when the airbag is unfolded, and the middle part being attached to the module in such a way that, when the airbag unfolds, the middle part is prevented from moving freely.

Such an airbag module is known from DE 197 49 914 A. There, an airbag is provided which in the inflated state has a front that faces the vehicle occupant and continues into a centered indentation that is formed in that a middle airbag part is prevented from moving freely out of the module. In this manner, a gas-filled chamber surrounding the indentation is formed. The middle part of the cover remains in place when the cover is opened, that is to say, it is not swiveled or moved towards outside. The important aspect of an airbag module with a stationary middle part is that it is held very firmly and securely on the rest of the module when the outlet opening is freed.

The invention provides an airbag module with which the cover may be designed to be lightweight but nevertheless very sturdy.

BRIEF SUMMARY OF THE INVENTION

According to the invention, an airbag module comprises an airbag and a front cover which is made of plastic. The front cover has a middle part and, surrounding the middle part, a predefined outlet opening for the airbag. In the closed state of the cover, the opening is surrounded by a ring-shaped part of the cover. The ring-shaped part is removed to free the outlet opening when the airbag is unfolded. The middle part is attached to the module in such a way that, when the airbag unfolds, the middle part is prevented from moving freely. The module further comprises a reinforcement ring which is embedded in the middle part and runs adjacent and along an inner edge of the ring-shaped part of the cover and attaches the middle part to the module, preventing it from moving freely when the airbag unfolds. The reinforcement ring, which is preferably a sheet metal ring, prevents the plastic from tearing out in the area of the middle part in the area of its attachment on the module side when the airbag unfolds. The reinforcement ring, which should be rigidly attached on the module side, holds the middle part back when the cover is opened. Due to the relatively large surface area of the ring, there is no risk of the plastic tearing out, in comparison, for example, to a screw embedded in the plastic. Moreover, the ring is provided on the outer edge of the middle part, that is to say, exactly in the area in which the transition to the ring-shaped part is provided, and in which, when the cover is supposed to tear open, there is also a high load on the cover. In this context, the reinforcement ring prevents the cover from tearing open any further. Since a reinforcement ring rather than a disk is provided, a considerable amount of material and thus weight can be saved, especially since the reinforcement ring, as already mentioned, is normally made of sheet metal.

It is more and more often the case that sophisticated-looking emblems made of metal or enameled metal are being placed on the cover by the manufacturers. These emblems are separate parts that have to be attached to the cover. One embodiment of the invention provides that the emblem, which is made as a separate part, has at least one attachment projection on the rear side, which extends through the middle part as well as radially inwards with respect to the reinforcement ring. This means that the emblem is not attached directly to the ring but rather that it extends through the hole in the ring and through the plastic situated therein. So far, the idea has been to attach emblems, for example, directly to inserted metal plates or to counter-plates that lie against the rear side of the cover. However, in the case at hand here, this would mean that the reinforcement ring would have to be configured wider radially inwards, which would come at the expense of the weight. The preferred embodiment provides that the reinforcement ring is not provided for this purpose and consequently can be configured more narrowly. However, since the reinforcement ring surrounds the attachment projection, there is no risk that the middle part of the cover will tear in the area of the attachment projection when the outlet opening is opened, thereby weakening the attachment of the emblem. Therefore, the reinforcement ring surrounds the attachment projection without being directly connected to it, somewhat like a protective wall.

Moreover, according to a preferred embodiment, the attachment projection is bent on the rear side of the middle part, i.e. the emblem is only attached to the plastic, so that no separate additional parts are needed for attachment purposes.

In another embodiment, there is provided a pot-shaped diffuser in the module, the front wall of the diffuser extending to the middle part of the cover. On the one hand, the reinforcement ring can be attached to the diffuser and on the other hand, as an alternative or additionally, the attachment projection can protrude through an opening in the diffuser, in order to be bent on the rear side so as to create a form-fitting connection between the diffuser and the emblem.

Preferably, the airbag is an annular chamber airbag of the type mentioned above. In the inflated state, it has a front facing the vehicle occupant and this front continues into a centered indentation. The latter is formed in that a middle airbag part that runs on the rear side of the middle section is prevented from moving freely out of the module. In this context, the indentation does not create a chamber filled with the gas that is blown in.

Preferably, the middle airbag part is attached to the module by the attachment of the reinforcement ring to the module and is prevented from moving freely when the airbag unfolds. Therefore, the reinforcement ring has a dual function since, on the one hand, it prevents the middle part of the cover and, on the other hand, the middle airbag part from moving freely out of the module.

DETAILED DESCRIPTION OF THE PREFERRED EMBODIMENTS

Figure 1:
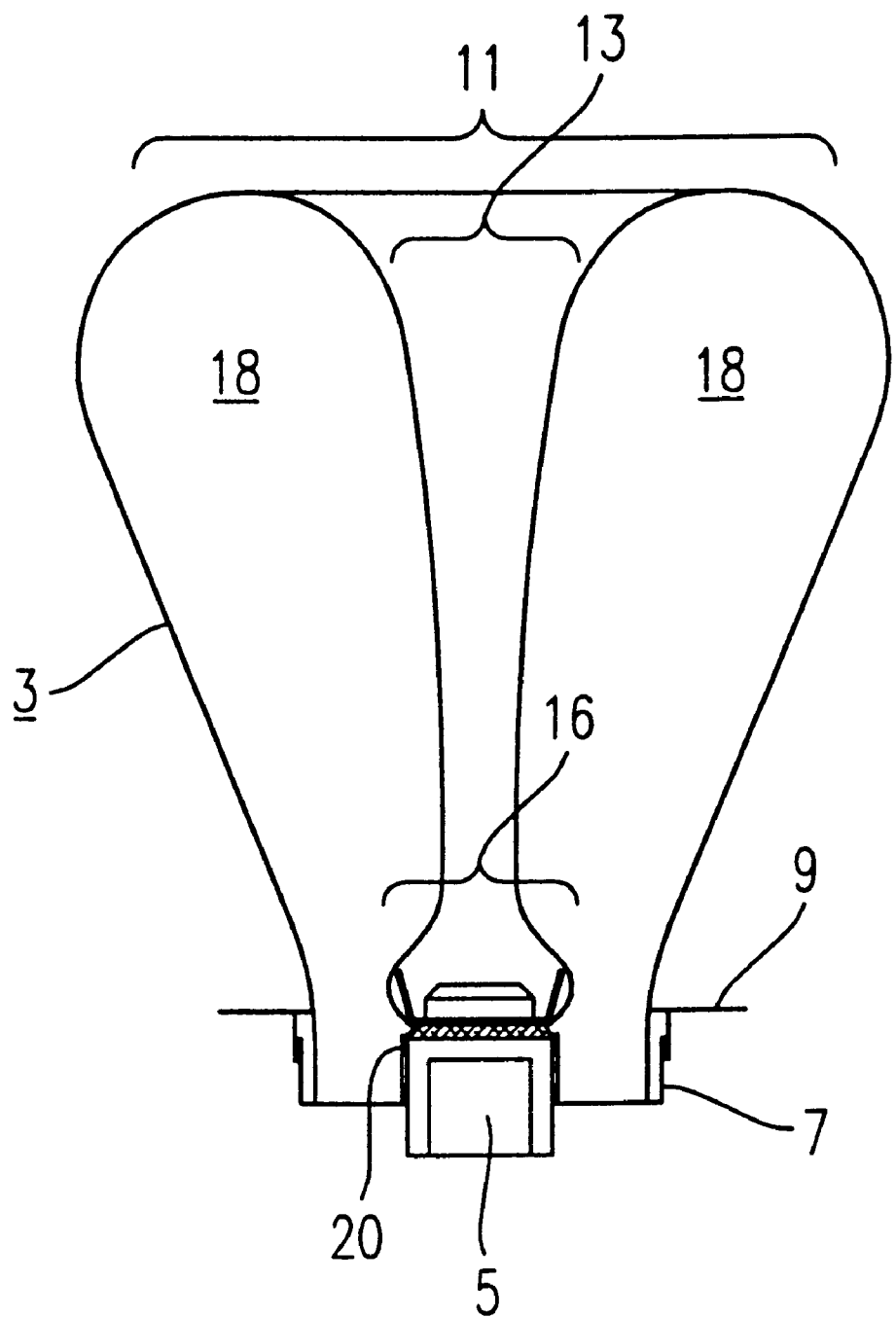
FIG. 1 is a schematic view of the airbag module according to the invention with an inflated airbag.

FIG. 1 shows an airbag module in a vehicle steering wheel, the airbag module serving to restrain the head and upper body and consisting of an airbag 3, a gas generator 5, a module housing 7 in which the airbag 3 and the gas generator 5 are accommodated, and a front cover 9 made of plastic.

The airbag 3 consists of an airbag wall made of fabric material which, relative to the inflated state, has several sides. A front 11 faces the vehicle occupant in the inflated state. The front 11 continues into a centered indentation 13 that is formed in that a middle airbag part 16 is attached on the module side in such a way that it is prevented from moving freely out of the module when the airbag unfolds. This results in a gas-filled annular chamber 18 that surrounds the indentation 13.

Figure 2:
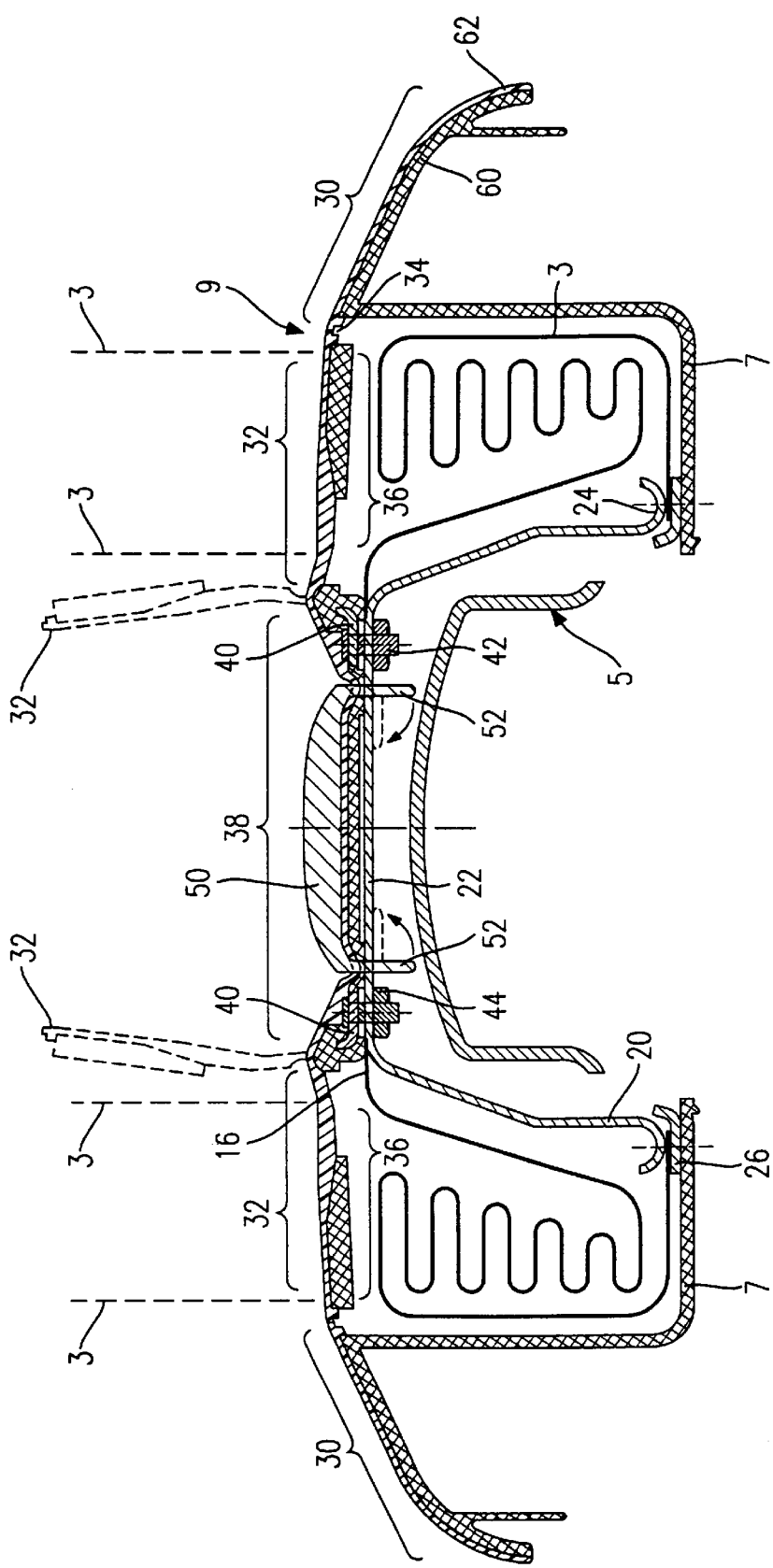
FIG. 2 is a sectional view through a first embodiment of the airbag module according to the invention, configured as a steering wheel module.
Figure 3:
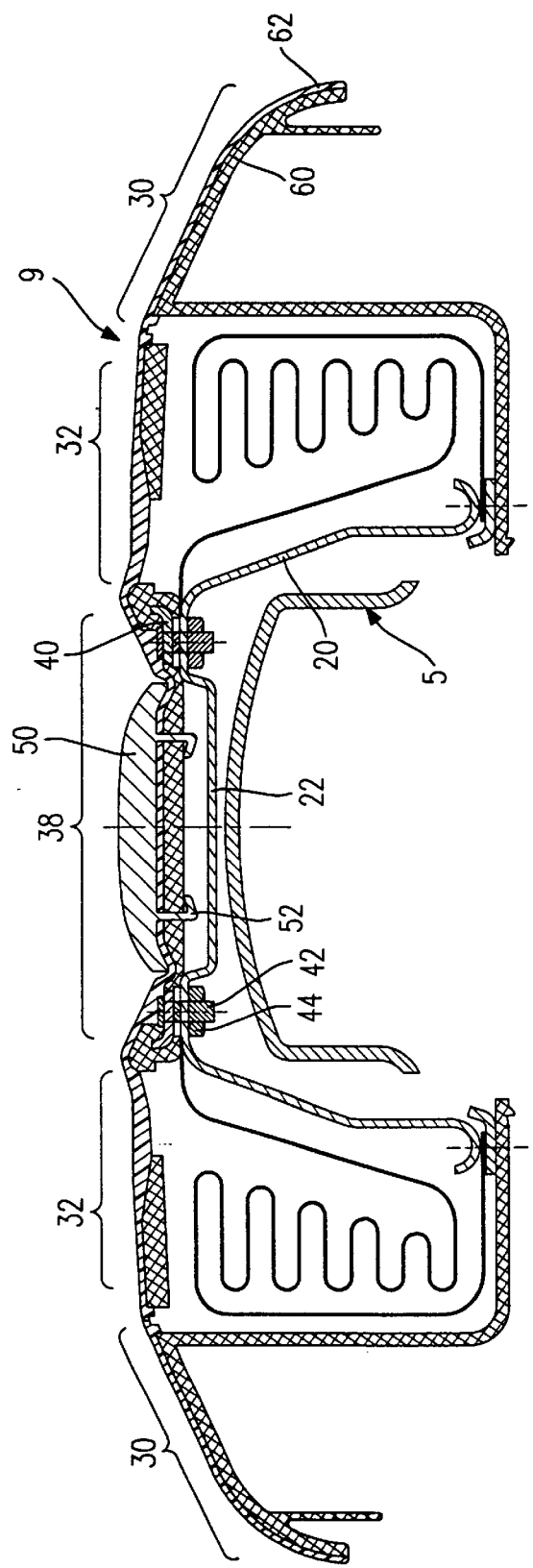
FIG. 3 is a sectional view through a second embodiment of the airbag module according to the invention, likewise configured as a steering wheel module.

The gas generator 5 is surrounded by a pot-shaped diffuser 20, the front wall 22 of the diffuser 20 adjoining the cover 9 (see FIGS. 2 and 3).

FIG. 2 shows the module more precisely, although only fragments of the gas generator 5 are shown. At the edge of its inflation opening, the airbag 3 is clamped between a flange 24 of the diffuser 20 and a reinforced base 26 of the module housing 7. The middle airbag part 16 is clamped between the front wall 22 and the cover 9, and it is securely fastened to the diffuser 20 and thus to the module.

The cover 9 made of plastic has several sections, namely, an outer part 30, a ring-shaped part 32 that is delimited from the outer part 30 by a weakening line 34 in the material and that closes off a ring-shaped outlet opening 36 for the airbag through which the airbag 3 can emerge from the module. The ring-shaped part 32 consists of flaps that are attached in one piece radially on the inside to a middle part 38 of the cover 7. The middle part 38, in contrast to the ring-shaped part 32, is prevented from moving freely at all in that it is rigidly attached to the diffuser 20. For this purpose, a reinforcement ring 40, preferably having a closed circumference, is embedded in the middle part, something which is done during the injection-molding or foaming of the cover 9. The reinforcement ring 40 is positioned on the outer edge of the middle part 38 and thus extends along the inner edge of the ring-shaped part 32. On the rear side, several threaded bolts 42 protrude from the reinforcement ring 40 and these bolts are non-permanently attached to the reinforcement ring. The threaded bolts 42 extend through openings in the airbag 3 and through openings in the diffuser 20. On the rear side of the front wall 22 of the diffuser 20, nuts 44 are screwed onto the threaded bolts 42. Due to this attachment device, the middle part 38, as already mentioned, is attached on the module side.

Visibly from the outside, an emblem 50 made of metal or enameled metal and configured as a separate part extends radially inwards from the reinforcement ring. The rear side of the emblem 50 has several attachment projections 52 that extend through the middle part 38 of the cover 9 and through corresponding openings in the front wall 22. On the rear side of the front wall 22, the attachment projections 52 are bent inwards during the assembly of the emblem, that is to say, they are deformed in such a way that the emblem 50 is attached to the middle part 38. There is no direct connection to the reinforcement ring.

The embodiment according to FIG. 3 corresponds to the embodiment of FIG. 2, except for the detail described below, which is why parts with the same function have been designated with the already introduced reference numerals and only the difference between the embodiments needs to be discussed here.

In contrast to the embodiment of FIG. 2, the rear attachment projections 52 do not penetrate through the front wall 22, which has an indentation in the area of the emblem 50, but rather only through the middle part 38 of the cover 9. On the rear side, however, the attachment projections 52 are bent so that a form-fitting connection is made between the attachment projections 52 and the plastic that forms the middle part 38.

As an alternative, the reinforcement ring 40 could also be attached to another part that does not move during the unfolding such as, for example, the gas generator.

It is also conceivable for the middle part 38 to only be moved a few centimeters axially towards outside when the cover 9 has to be opened in case of restraint. Nevertheless, the middle part 38 and thus the middle airbag part 16 are prevented from moving freely towards outside since an indentation 13 is still present.

As can be seen in FIGS. 2 and 3, the cover 9 is a two-component cover having an inner carrier layer 60 that also continues in one piece into the module housing 7, and having an outside cover layer 62. The reinforcement ring 40 is laid into the injection mold during the injection molding of the cover and is completely surrounded with plastic.

What is claimed is:

1. An airbag module, comprising an airbag, a front cover which is made of plastic, said front cover having a middle part and, surrounding said middle part, a predefined outlet opening for said airbag, said opening in a closed state of said cover being surrounded by a ring-shaped part of said cover, said ring-shaped part being removed to free said outlet opening when said airbag is unfolded, and said middle part being attached to said module in such a way that, when said airbag unfolds, said middle part is prevented from moving freely, and a reinforcement ring which is embedded in said middle part and runs adjacent and along an inner edge of said ring-shaped part of said cover and attaches said middle part to said module, preventing it from moving freely when said airbag unfolds.

2. The airbag module according to claim 1 further comprising an emblem which is made as a separate part and has at least one attachment projection on a rear side thereof, said attachment projection extending through said middle part of said cover as well as radially inwards with respect to said reinforcement ring.

3. The airbag module according to claim 2, wherein said middle part is of plastics and wherein said attachment projection is only attached to said plastic of said middle part.

4. The airbag module according to claim 3, wherein said attachment projection is bent on said rear side of said middle part.

5. The airbag module according to claim 1, wherein there is provided a pot-shaped diffuser in said module which has a front wall extending towards said middle part of said cover, said reinforcement ring being attached to said diffuser.

6. The airbag module according to claim 2 further comprising a pot-shaped diffuser arranged in said module, said diffusor having a front wall which extends to said middle part of said cover, and said attachment projection protruding through an opening in said diffuser and is deformed on a rear side thereof.

7. The airbag module according to claim 1, wherein said airbag, when inflated, has a front side that faces a vehicle occupant and continues into a centered indentation that is formed in that a middle airbag part running on said rear side of said middle section of said cover is prevented from moving freely out of said module, so that a gas-filled chamber surrounding said indentation is formed.

8. The airbag module according to claim 7, wherein, through said attachment of said reinforcement ring, said middle airbag part is attached to said module and is prevented from moving freely when said airbag unfolds.

* * * * *